Patented July 1, 1941

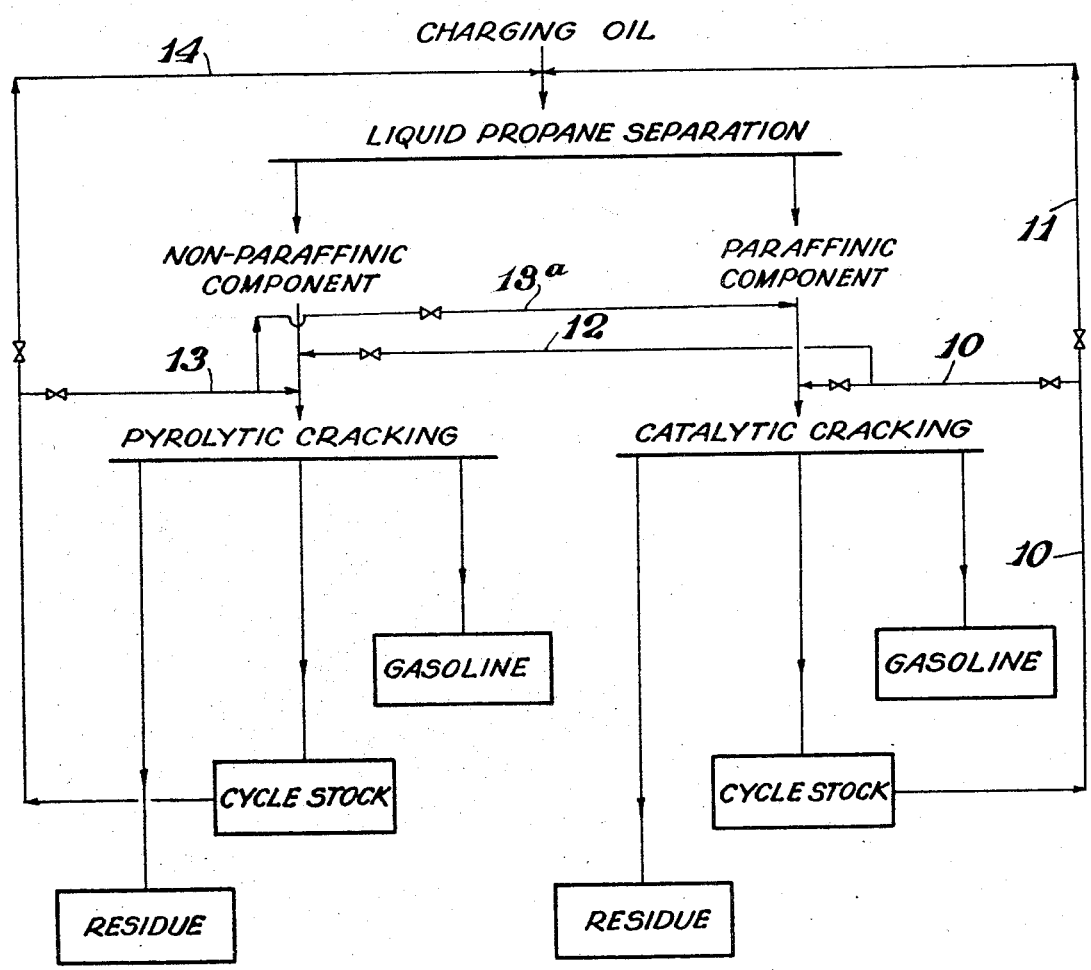

2,247,535

UNITED STATES PATENT OFFICE 2,247,535

PROCESS FOR THE TREATMENT OF HYDROCARBON OIL

Vanderveer Voorhees, Hammond, Ind., assignor to Standard Oil Company, Chicago, Ill., a corporation of Indiana Application June 16, 1937, Serial No. 148,555

3 Claims. (Cl. 196—13)

This invention relates to processes for the formation of gasoline or other light hydrocarbons from relatively heavy hydrocarbon oil, and pertains more particularly to processes for catalytically cracking relatively heavy hydrocarbon oil to form gasoline or other desired light products.

Processes are now known according to which relatively heavy hydrocarbon oil is converted into gasoline or other relatively light hydrocarbons by being subjected to a preliminary heating operation wherein it is raised to a temperature sufficient to promote a catalytic cracking reaction and is subsequently passed through a mass or bed of finely divided solid catalytic material, such as adsorbent clay, this material being in some cases granular or in pellet form, and in other instances being even more finely divided. These processes have met with considerable success but have been open to the objection that deterioration of the catalytic material occurs after prolonged operation, due to the accumulation by the catalytic material of carbonaceous matter or coke resulting from the cracking reaction taking place. This carbonaceous material or coke appears to penetrate the pores of the catalytic material, thereby reducing the active surface thereof, and also tends to encase each particle of catalytic material in a sheath of carbonaceous material or coke. The catalytic material must then be discarded or revivified, the latter procedure being preferable since a saving in operating costs can usually be effected thereby. Certain types of finely divided solid catalysts require careful treatment during the regeneration thereof so that their effectiveness will not be destroyed.

One method of regenerating or revivifying such catalysts is to pass therethrough a stream of air or other oxygen containing gas to combine with and carry away the carbonaceous deposits. This action generates considerable quantities of heat and therefore must be carried out slowly so as to prevent the temperature of the mass from rising to a value which would cause the destruction thereof. The result, in many instances, is that the operation must be conducted so slowly that three separate quantities of catalytic material are necessary to carry out a continuous catalytic cracking process on the hydrocarbon oil to be treated. One mass of catalytic material is used catalytically to crack the hydrocarbon oil, while a second mass is being revivified, and a third mass is being held in reserve for use when the first-mentioned mass has lost its effective catalytic value. All of this follows from the fact that the revivifying time of the catalysts is in excess of their effective time of continuous operation as a cracking catalyst. It therefore is evident that any substantial increase of the operating time of these cracking catalysts will effect a considerable saving, particularly if the time of operation can be extended so as to exceed the revivifying time. The result would obviously be to eliminate one of the three masses of material, for one thing, as well as the lengthening of the operating life of the other masses.

In accordance with my invention the operating period of a finely divided solid catalytic material is increased by pretreating the hydrocarbon charging stock to lessen its coke-forming tendencies when subsequently contacted with the catalytic cracking material. In a previous application, Ser. No. 751,998, filed November 8, 1934, of which this application is a continuation-in-part, I described and claimed various methods of pretreatment. The present application relates to pretreating the hydrocarbon charging stock with liquefied hydrocarbon gases, particularly liquid ethane, propane and butane, or mixtures thereof, whereby the life of the cracking catalyst is greatly increased. The liquefied normally gaseous hydrocarbon which I prefer to employ is propane. It may contain moderate amounts of propylene but I find that better results are obtained with propane substantially free from propylene.

Treatment of the charging stock with these hydrocarbons serves to separate an insoluble fraction from the charging stock, the soluble fraction being passed to the catalytic cracking operation while the insoluble fraction is diverted therefrom and may be separately cracked pyrolytically. Treating the charging oil with propane and other similar light hydrocarbon causes the separation of asphaltenes and other high boiling coke-forming constituents and particularly those constituents of naphthenic character having a high ratio of carbon to hydrogen.

Temperatures from —100° F. up to the critical temperature of the liquefied normally gaseous hydrocarbon may be used, but it is preferred to operate in the vicinity of the critical temperature of the solvent. Thus, employing propane, I may operate at a temperature of about 130 to 180° F., whereas with liquid butane a temperature of 250 to 300° F. may be employed. In carrying out the treatment the oil may be mixed with the hydrocarbon solvent and heated to the desired temperature at which separation into two phases occurs, or the oil may be continuously extracted countercurrently with a stream of the liquefied hydrocarbon gas in a suitable extraction tower, usually maintained under pressure to prevent evaporation of the hydrocarbon gas.

The above-mentioned and further objects and advantages of my invention and the manner of attaining them will be more fully explained in the following description taken in conjunction with the accompanying drawing.

Referring more particularly to the drawing, the charging oil, which may be gas oil, kerosene, heavy naphtha or other suitable charging stock, preferably distilled, is first subjected to propane extraction to separate it into soluble and insoluble components. The former is subjected to a catalytic cracking operation wherein it is first vaporized and raised to a catalytic cracking temperature, preferably in the range of 750° to 900° F., but which may be lower or higher than these values, and is subsequently passed in vapor form through a bed or mass of finely divided solid catalytic material, such as soda lime, caustic soda, silica gel coated with adsorbed alumina, bauxite, the double salts of sodium and aluminum chloride, activated bentonite, Death Valley clay, fuller's earth or other argillaceous earth, or the like, this preferably being in granular or pellet-like form, comprising pellets in the neighborhood of one-quarter inch in diameter. Or the catalytic material may be finely divided copper or other metal, metal oxide, chromium oxide, or the like. In its passage through this bed of catalytic material the oil is converted into lighter products, including those sufficiently light for use as the final desired product, e. g., gasoline. These catalytically cracked products are then separated into the final desired distillate such as gasoline, cycle stock and heavy residue.

Simultaneously, the insoluble component may be subjected to pyrolytic cracking by being raised to a pyrolytic cracking temperature in the range of 800° to 1000° F. more or less, in the customary manner, to form the final desired distillate such as gasoline, cycle stock and residue. The two gasoline distillates obtained may be blended if desired, while the cycle stock may be subjected to further treatment if desired. The gasoline formed by the catalytic cracking process, particularly where activated bentonite or Death Valley clay is used, has relatively high anti-knock value and constitutes a good blending agent to form a high anti-knock motor fuel. The pyrolytic cracking conditions may be so selected as to produce gasoline of high anti-knock value also, the pyrolytic cracking being carried out, for example, under so-called vapor phase cracking conditions and preferably in the absence of catalysts. In the case of the higher boiling charging stocks, the insoluble component may be subjected to cracking in the liquid phase for the production of coke, if desired.

In carrying out my process I may return the intermediate boiling cycle stock obtained from cracking the propane soluble component of the charging oil directly to the catalytic cracking operation as shown by the line 10, or I may resubject it to propane treatment as indicated by line 11. If desired, I may also divert part or all of this cycle stock to the pyrolytic cracking operation by line 12.

Likewise the cycle stock from the pyrolytic cracking operation may be returned directly thereto by line 13, directly to the catalytic cracking operation by line 13a or, if desired, it may be returned by line 14 to the propane refining step of the process in which case propane soluble constituents are recovered and subjected to catalytic cracking.

The amount of propane insoluble component separated in my process will vary with the nature of the charging oil, the more naphthenic type charging oils requiring separation of a larger proportion of insoluble constituents, for example as much as 20 to 50% may be separated. In general, however, the amount of insoluble components removed may be about 5 to 20% of the charging oil. Propane is recovered from the soluble and insoluble components and recycled in the propane separation step. There is ordinarily no objection, however, to allowing a portion of the propane to remain in the oils charged to the catalytic and pyrolytic cracking operations.

By my invention the catalytic material used in carrying out the catalytic cracking step is assured of a relatively long operating period, because of the fact that the charging stock is specially selected and prepared to have low coke-forming tendencies during its subsequent treatment, the coke-forming constituents being removed from the oil before the oil is subjected to the catalytic cracking treatment. A further advantage is also obtained, particularly when the activated bentonite, Death Valley clay, or similar catalysts are used due to the fact that the catalysts mentioned cause the formation of relatively high anti-knock gasoline constituents, and the propane soluble components of the charging oil are those which have a tendency to form lower anti-knock gasoline than the propane insoluble constituents, when subjected to a conventional type pyrolytic cracking process. Thus by subjecting the soluble components to catalytic cracking I may obtain a gasoline with a knock rating of 75 to 80 octane number, whereas straight pyrolytic cracking of this stock would yield a gasoline of only to 60–65 octane number.

When employing liquefied hydrocarbon gases as solvents for separating the cracking stock I may, as previously stated, employ propane or I may employ ethane, methane, butane, or isobutane. When using propane I prefer to operate at temperatures lying between 150–210° F. since I find that an increase in the temperature in this range causes the separation of larger amounts of coke-forming constituents which are undesirable in the catalytic cracking operation.

As an example of the separation of a cracking stock with propane at elevated temperature a distillate fraction from Mid-Continent crude oil, having a viscosity of 68 at 210° F. and a gravity of 15.7° A. P. I. was dissolved in approximately eight volumes of propane and heated to a temperature of 202° F. The solution separated into two layers, the oil in the bottom layer having a gravity of 11.6° A. P. I. and in the top or propane soluble layer the oil had a gravity of 18.1° A. P. I. On subjecting the latter oil to catalytic cracking there is considerably less tendency to cause coke to deposit on the catalyst and render it inactive. Although I have described the use of certain specific liquefied normally gaseous hydrocarbons in treating the charging oil in my process and specifically the use of liquid propane. I intend, however, that the term "propane" encompass other similar hydrocarbons which may be used, such as ethane and butanes.

While I have described certain specific examples for the purposes of illustration, it should be understood that various modifications and adaptations thereof, occuring to one skilled in the art, may be made within the spirit of my invention as set forth in the appended claims.

I claim:

1. In the process of converting heavy hydrocarbon oils into gasoline wherein said oils are subjected to the action of a solid cracking catalyst at an elevated temperature and wherein the life of said catalyst is terminated by the deposition of carbonaceous material thereon, the improvement comprising initially subjecting said heavy hydrocarbon oil to separation by liquid propane into a soluble and an insoluble fraction, subjecting said soluble fraction to the action of said solid cracking catalyst at a temperature above about 750° F. and subsequently fractionating the resulting products into gasoline, and a heavier fraction, subjecting said insoluble fraction to pyrolytic cracking at a temperature in the range of about 800 to 1000° F. and fractionating the resulting products into gasoline, recycle oil and tar, and returning the recycle oil from the pyrolytic cracking operation and the heavier than gasoline fraction from the catalytic cracking operation to the pyrolytic cracking operation.

2. In the process of converting heavy hydrocarbon oils into gasoline wherein said oils are subjected to the action of a solid cracking catalyst at an elevated temperature and wherein the life of said catalyst is terminated by the deposition of carbonaceous material thereon, the improvement comprising initially subjecting said heavy hydrocarbon oil to separation by liquid propane into a paraffinic and a non-paraffinic fraction, subjecting said paraffinic fraction to the action of a cracking catalyst at a temperature above about 750° F. and subsequently fractionating the resulting products into gasoline, recycle oil and tar, subjecting said non-paraffinic fraction to pyrolytic cracking at a temperature in the range of about 800 to 1000° F. and fractionating the resulting products into gasoline, recycle oil and tar, and returning the recycle oil from the catalytic cracking operation to the pyrolytic cracking operation.

3. In the process of converting heavy hydrocarbon oils into gasoline wherein said oils are subjected at an elevated temperature to the action of a solid cracking catalyst, wherein the activity of said catalyst is progressively diminished by the deposition of carbonaceous material thereon, the improvement comprising initially subjecting said heavy hydrocarbon oil to separation by a liquefied normally gaseous hydrocarbon into a soluble and an insoluble fraction, subjecting said soluble fraction to the action of said solid catalyst at a temperature above about 750° F., subsequently fractionating the resulting products into gasoline and a heavier than gasoline fraction, subjecting said insoluble fraction to pyrolytic cracking substantially without catalysts at a temperature in the range of about 800 to about 1000° F., fractionating the resulting products of pyrolytic cracking into gasoline and a heavier than gasoline fraction, and recycling the heavier than gasoline fraction from both the catalytic and pyrolytic cracking operations directly to the pyrolytic cracking operation for further conversion into gasoline therein.

VANDERVEER VOORHEES.